E. A. HALBLEIB.
BATTERY CHARGING APPARATUS.
APPLICATION FILED APR. 3, 1911.

1,024,448.

Patented Apr. 23, 1912.

Witnesses:
C. W. Carroll
L. Thon

Inventor:
Edward A. Halbleib
by his attorneys
Osgood, Davis & Dorsey

UNITED STATES PATENT OFFICE.

EDWARD A. HALBLEIB, OF ROCHESTER, NEW YORK, ASSIGNOR TO NORTHEAST ELECTRIC COMPANY, OF ROCHESTER, NEW YORK, A CORPORATION.

BATTERY-CHARGING APPARATUS.

1,024,448.  Specification of Letters Patent.  Patented Apr. 23, 1912.

Application filed April 3, 1911. Serial No. 618,743.

*To all whom it may concern:*

Be it known that I, EDWARD A. HALBLEIB, a citizen of the United States, and resident of Rochester, in the county of Monroe and State of New York, have invented certain new and useful Improvements in Battery-Charging Apparatus, of which the following is a specification.

This invention relates to apparatus by which the charging of a storage-battery may be automatically controlled, so as to discontinue the charging operation when the battery is fully recharged and to resume the operation when the battery has become partly discharged.

The object of the invention is to produce a simple and reliable apparatus operating electrically, in accordance with the variations in the electromotive force of the storage-battery, and particularly to produce an apparatus of this kind which shall be sensitive, so that little current need be employed to actuate it, and which, at the same time, shall open and close the circuits controlled thereby positively at distinct predetermined voltages in the battery-circuit.

To the above ends I employ an electromagnetic instrument, in the nature of a voltmeter, comprising a field-winding and an oscillatory coil, both of which are energized constantly by current from the battery, this device being the primary controlling device of the apparatus and being used to actuate a novel and simple mechanism for opening and closing the circuits at two predetermined positions of the oscillatory coil. In the preferred form of the invention I also employ, in connection with the device just described, an electromagnetic device in the nature of a relay for controlling directly the source of current from which the battery is charged, this latter device being normally deënergized, so as to economize current, but being temporarily energized at times when its operation is required to start or interrupt the charging operation.

Figure 1:
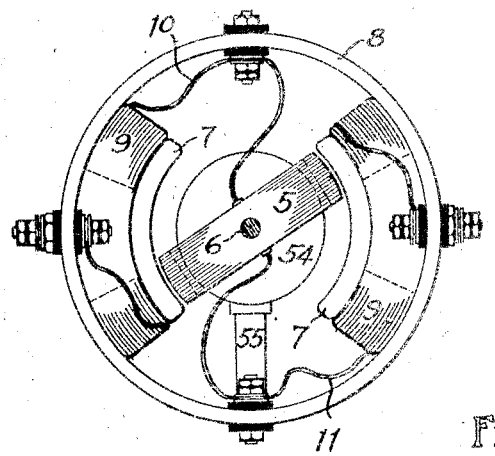
Figure 2:
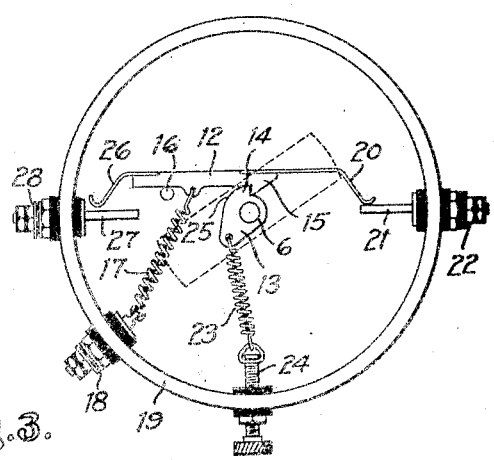
Figure 3:
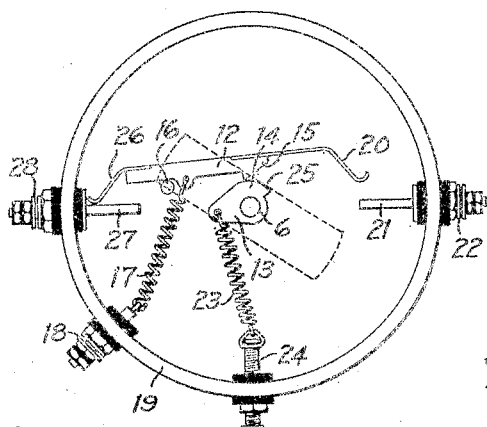
Figure 4:
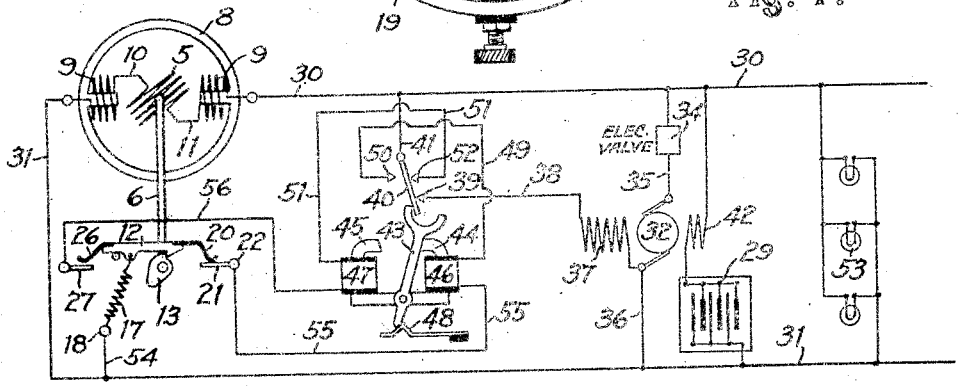

In the accompanying drawing: Figure 1 is a front-elevation of a portion of the voltmeter, including the oscillatory coil and the field-magnet; Figs. 2 and 3 are front elevations of the circuit-controlling mechanism actuated by the volt-meter, this mechanism being shown in two different positions; and Fig. 4 is a diagram illustrating the electrical connections in a storage-battery system in which the present invention is embodied.

In the illustrated embodiment of the invention the portion of the apparatus comprising the oscillatory coil and the field-magnet, which portion is hereinafter referred to as the "volt-meter," is illustrated particularly in Fig. 1. The coil 5 is mounted upon a rock-shaft 6, and is oscillated between two iron pole-pieces 7 which are connected by an iron ring 8 so as to produce a magnetic circuit with an air-gap occupied by the coil 5. In place of the permanent magnet usually employed to produce a magnetic field in devices of this type I employ an electromagnetic field, the polar extensions 7 being, for this purpose, provided with windings 9, and these windings are connected, through wires 10 and 11, respectively, in series with the coil 5. The windings and the coil are of high resistance so as to use little current, but owing to the fact that the energization of both the field and the coil increase and decrease with the electromotive force of the current, the device is very sensitive to changes in the electromotive force, and thus its action is positive and reliable even though little current be expended in operating the volt-meter. Within the coil 5 is a stationary iron core 54, which is supported on a pillar 55.

The circuit-controlling mechanism actuated by the volt-meter is shown particularly in Figs. 2 and 3. It comprises a contact-bar 12 which coöperates with a trip 13 fixed on the forward end of the rock-shaft 6. This trip is provided with a lug 14, and the contact-bar is provided with a depending lug 15. The right-hand end of the bar is supported by resting upon the trip, while near its left-hand end the bar is supported on a pin 16. By means of a spring 17 the bar is held constantly against the pin and the trip, and the spring tends also to draw the bar to the left, owing to the oblique position of the spring. The lower end of the spring is secured to a binding-post 18 which is mounted in the casing 19 of the mechanism, and the spring is thus utilized as an electrical connection between the contact-bar and other parts of the apparatus. The contact-bar carries at its right-hand end a contact-spring 20 which, in the position of the apparatus shown in Fig. 2, engages a fixed contact 21 connected with a binding-post 22. A spring 23, connected at one end to the trip 13, tends to rock the latter and the rock-shaft 6 into the position of Figs. 1 and 2. The lower end of the spring 23 is connected with an adjusting screw 24, by means of which the tension of the spring may be regulated.

With the parts in the position of Figs. 1 and 2, and with current flowing through the volt-meter in the proper direction, the coil 5 tends to swing to the right, or clockwise, while this action is opposed both by the spring 17 and by the spring 23, the former spring acting in this manner through the engagement of the lugs 14 and 15. As the current in the volt-meter increases in strength the coil gradually overcomes the springs and swings to the right, and the lug 14 thus moves the lug 15 and the contact-bar also to the right. During the first part of this movement the bar slides over the pin 16, and the contact-spring 20 remains in engagement with the fixed contact 21. During this movement, however, the lug 14 swings downward in its circular path, until finally its upper extremity passes below the lower end of the lug 15. When so released the lug 15 immediately rides upward upon the curved surface 25 of the trip, and is drawn to the left and into the position of Fig. 3. In this position the right-hand end of the contact-bar is tilted upward, being supported upon the lug 15 as shown in the figure, and thus the contact-spring 20 disengages the fixed contact 21. By the same action a contact-spring 26 at the left-hand end of the contact-bar is tilted downward into engagement with a fixed contact 27 which is connected with a binding-post 28. The volt-meter thus acts, when the current attains a certain strength, to open one circuit and close another. With the parts in the position of Fig. 3, if the current begins to diminish in strength, the spring 23 gradually overcomes the action of the coil and swings the coil backward or to the left. This action does not immediately produce any change in the position of the contacts, however, but as the trip rocks the lug 14 gradually approaches the position of the lug 15, until finally it passes under the latter lug, whereupon the contact-bar immediately drops to the position of Fig. 2 again, thus throwing the spring 26 out of engagement and the spring 20 into engagement with the corresponding fixed contact.

It will be obvious that through the operation above described the volt-meter acts to open and close the respective circuits controlled thereby at two predetermined voltages, while remaining inactive between these voltages, and thus the charging of the storage-battery is started and discontinued at points which permit the battery to be intermittently discharged to the extent necessary to maintain the battery in the best condition. The voltages at which the device operates may be controlled by adjusting the spring 23.

The volt-meter and the circuit-controlling mechanism actuated thereby may be employed to control directly the operation of the charging dynamo upon the storage-battery, and in this case one pair of the contacts above described may be dispensed with. To secure a positive action, however, in throwing the charging dynamo into and out of operation it is preferable to employ the volt-meter indirectly, the volt-meter being connected with a circuit-controller in the nature of a relay, which latter controls directly the dynamo-circuit. Such an arrangement is illustrated in Fig. 4. Here the terminals of the storage-battery 29 are connected with two wires 30 and 31 which are the main wires of the system in which the battery is used. These wires are connected with the terminals of the windings of the volt-meter, so that current from the storage-battery constantly flows through the volt-meter.

The battery is charged by a dynamo 32, of which the brushes are connected, through wires 35 and 36, with the main wires 30 and 31, respectively. An electric valve 34 is interposed in the wire 35 to prevent reverse flow of current through the armature from the battery when the dynamo is at rest. As such devices are well known the construction of the valve need not be illustrated or described herein.

The dynamo is controlled by controlling the flow of current through its main field-winding 37. This is a shunt-winding, and one terminal is connected with the lower brush of the dynamo, while the other terminal is connected, through a wire 38, with a fixed contact 39 of the relay. The relay is provided also with a movable contact-arm 40, and this arm is connected, through a wire 41, with the main wire 30, thus completing the circuit through the armature and through the field 37, and this is the normal condition of the apparatus when the dynamo is charging the battery.

To regulate the operation of the dynamo, and prevent too rapid charging of the battery, the dynamo is provided with an opposition-winding 42 which is interposed in the connections between the battery and the dynamo, and this opposition-winding acts in a well-known manner to limit the amount of current generated by the dynamo and flowing through the battery.

The electromagnetic device by which the contact-arm 40 of the relay is actuated comprises an armature 43 coöperating with two pole-pieces 44 and 45, which are energized by coils 46 and 47, respectively. The armature has a forked upper extremity which coöperates with the contact-arm 40, while the lower extremity of the armature coöperates with a spring 48. The arrangement of these parts is such, as shown in Fig. 4, that the armature is retained in either right-hand or left-hand position by the spring 48, thus retaining the contact-arm in one position or the other. With the parts in the position of Fig. 4, however, if the coil 47 be energized while the coil 46 is deënergized, the armature will be drawn to the left. When about half of this movement has been completed the forked upper extremity of the armature engages the contact-arm 40 and swings it out of engagement with the right-hand fixed contact. At the same time the lower end of the armature passes over a hump on the spring 48, so that the movement of the armature to the left is continued under the influence of the spring even after the coil 47 has been deënergized, and thus the armature completes its movement and swings the contact-arm into engagement with its left-hand fixed contact.

The connections between the circuit-controlling mechanism actuated by the volt-meter and the circuits in and controlled by the relay are such that one of the coils 46 and 47 of the relay is momentarily energized, but immediately afterward deënergized, whenever the relay is operated to start or discontinue the charging of the battery. To this end one terminal of the coil 46 is connected, through a wire 49, with a fixed contact 50 at the left of the contact-arm 40, while the other terminal of the coil is connected, through a wire 55, with the binding-post 22. One terminal of the coil 47 is similarly connected, through a wire 51, with a right-hand fixed contact 52 of the relay. The binding-post 18 is connected, through a wire 54, with the main wire 31. The arrangement just described is such that with the parts in the position illustrated in Figs. 2 and 4 the relay is deënergized. Supposing, however, the volt-meter turns to the right until the parts assume the position of Fig. 3; in this case current flows from the wire 31 through a wire 54, the spring 17, the contact-arm 12, the contact-spring 26, the fixed contact 27, and a wire 56 to the coil 47, and thence, through a wire 51 and the fixed contact 52, to the contact-arm 40. From the contact-arm the current returns through a wire 41 to the wire 30. A circuit is thus completed through the coil 47 and energized by the battery current. The armature 43 is then drawn to the left. In the course of the movement it engages the contact-arm 40 and swings it also to the left, thus disengaging it from the fixed contact 52 and deënergizing the coil 47. The energization of the coil 47 is thus only momentary, the latter part of the movement of the armature being produced by the spring 48. The action of the coil 46 is similarly controlled by the contact-spring 20 and the fixed contact 21 when the volt-meter moves back to the position of Fig. 2.

The relay acts to control the dynamo through the engagement of the contact-arm 40 with the fixed contact 39. In the right-hand position of the contact-arm these parts act to close the circuit through the field winding 37, and thus the battery is charged until the resulting movement of the volt-meter coil 5 to the right causes the coil 47 to act, as just described, to disengage the contact-arm 40 from the fixed contact 39.

The circuit-controlling devices above described may be employed in connection with a storage-battery system such as is used on automobiles or railway-trains, although it is not limited to such use. Such a system is commonly employed to energize the electric lights and other devices on automobiles, and in Fig. 4 a number of electric lights 53 are indicated connected across the main wires 30 and 31, these lights being supplied with current at all times from the storage-battery whether or not the dynamo 32 is running.

I am aware that the general arrangement of the battery circuit above described, including the generator, the battery, the opposition-winding and the electric valve, is not novel, and the present invention resides particularly in the construction and operation of the automatic devices including the volt-meter, the circuit-controlling mechanism actuated thereby, and the relay device.

I claim:—

1. In combination with a storage-battery, battery-charging apparatus comprising a source of electricity, a field-winding, a coil movable between the poles of the field produced by said winding, connections between the field-winding, the coil and the storage-battery, whereby the field-winding and the coil are constantly energized by current from the battery, circuit-controlling contacts mechanically connected with, and actuated by, the coil, said contacts being engaged when the coil has moved through a predetermined distance in one direction and being disengaged when the coil has returned through a predetermined distance in the opposite direction, and connections between said contacts, the source of electricity and the battery, whereby the charging of the battery is controlled in accordance with the movements of the coil.

2. In combination with a storage-battery, battery-charging apparatus comprising a source of electricity, means for producing a magnetic field, a coil movable between the poles of the field, connections between the coil and the storage-battery, whereby the coil is constantly energized by current from the battery, a rotatable trip connected with, and actuated by, the coil and provided with a lug, a contact-bar resting on the trip and having a lug coöperating with the lug on the trip, a spring connected with the contact-bar and tending both to maintain the contact-bar in engagement with the trip and to move the bar longitudinally, coöperating contacts, one of which is carried by the contact-bar, and connections between said contacts, the source of electricity and the battery, whereby the charging of the battery is controlled in accordance with the movements of the coil.

3. In combination with a storage-battery, battery-charging apparatus comprising a source of electricity, volt-meter connections between the volt-meter and the storage-battery whereby the volt-meter is constantly energized by current from the battery, two pairs of circuit-controlling contacts mechanically connected with, and actuated by, the volt-meter so as to be alternatively closed by the opposite movements thereof, a relay device comprising a plurality of magnets connected with, and controlled by, said pairs of contacts respectively, a circuit-controller actuated by said magnets and comprising coöperating contacts connected in series with said magnets, respectively, and arranged to break the circuit through each magnet upon the movement resulting from the energization of said magnet, connections between the battery and said magnets whereby the magnets are energized under the control of said contacts, and connections between the source of electricity and said circuit-controller, whereby the charging of the battery is controlled by the relay device.

4. In combination with a storage-battery, battery-charging apparatus comprising a source of electricity, a field-winding, a coil movable between the poles of the field produced by said winding, connections between the field-winding, the coil and the storage-battery, whereby the field-winding and the coil are constantly energized by current from the battery, a rotatable trip connected with, and actuated by, the coil, a contact-bar coöperating with the trip, the trip and the bar being provided with coöperating lugs, a spring connected with the contact-bar and arranged both to hold the bar in engagement with the trip and to move the bar longitudinally, coöperating contacts, one of which is carried by the contact-bar, and connections between said contacts, the source of electricity and the battery, whereby the charging of the battery is controlled in accordance with the movements of the coil.

EDWARD A. HALBLEIB.

Witnesses:
D. GURNEE,
L. THON.

---

Copies of this patent may be obtained for five cents each, by addressing the "Commissioner of Patents, Washington, D. C."